United States Patent [19]
Pipkin et al.

[11] Patent Number: 4,982,384
[45] Date of Patent: Jan. 1, 1991

[54] SPLIT BEAM SONAR

[75] Inventors: Edward L. Pipkin; Garrett G. Salsman, both of Panama City, Fla.

[73] Assignee: The United States of America as represented by the Secretary of the Navy, Washington, D.C.

[21] Appl. No.: 184,237

[22] Filed: Sep. 27, 1971

[51] Int. Cl.⁵ .............................................. G01S 15/00
[52] U.S. Cl. ........................................ 367/95; 367/99; 367/113
[58] Field of Search ................. 340/3 R, 3 E; 343/7.3, 343/7.5, 7.4; 367/87, 113, 95, 97, 99

[56] References Cited
U.S. PATENT DOCUMENTS

| | | | |
|---|---|---|---|
| 2,467,368 | 4/1949 | Batchelder | 367/95 |
| 2,912,671 | 11/1959 | Hayes | 367/95 |
| 2,965,876 | 12/1960 | Meunier et al. | 367/97 |

Primary Examiner—Thomas H. Tarcza
Assistant Examiner—Daniel T. Pihulic
Attorney, Agent, or Firm—Sol Sheinbein; John Becker; Harvey David

[57] ABSTRACT

A sonar system is disclosed that includes contiguously angularly disposed and oppositely rotated transmitting and receiving transducers for broadcasting an acoustic signal and for receiving target echoes thereof, respectively, at different angles from within overlapping zones thereof within an aqueous medium. A gated transmitter is employed to timely energize said transmitting transducer, and a gated target seeking receiver is employed to process the output signal of said receiving transducer. A cathode ray tube readout displays target signals from said receiver. A light sensitive probe produces an electrical output signal in response to a target signal displayed on said cathode ray tube which is used for gating the aforesaid transmitter and receiver in such manner as to accentuate the displayed target signal being probed at any given instant.

12 Claims, 2 Drawing Sheets

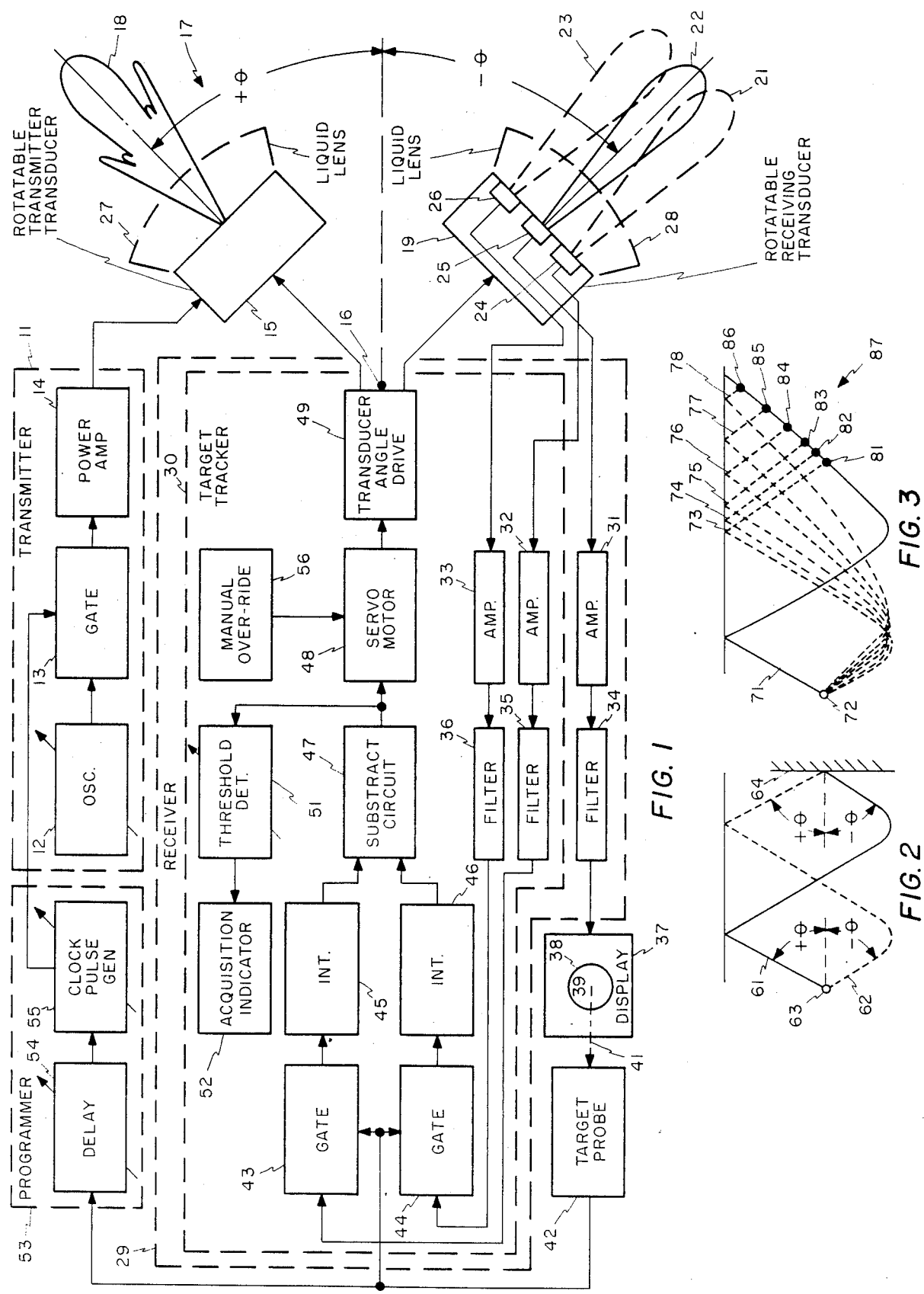

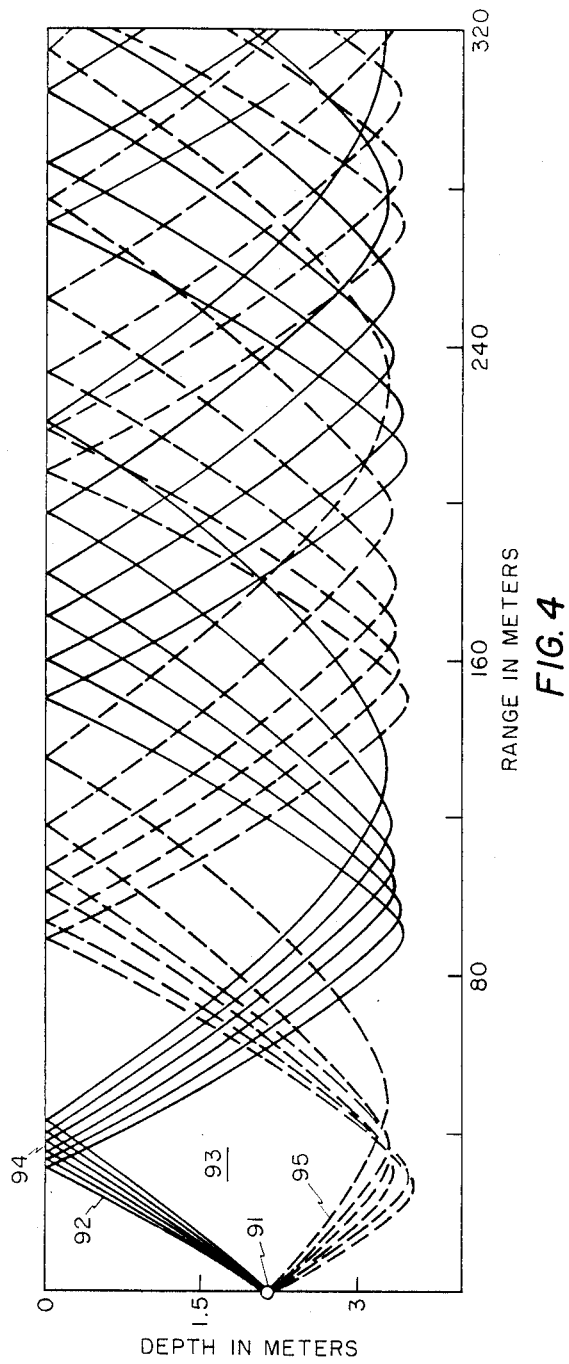
FIG. 4
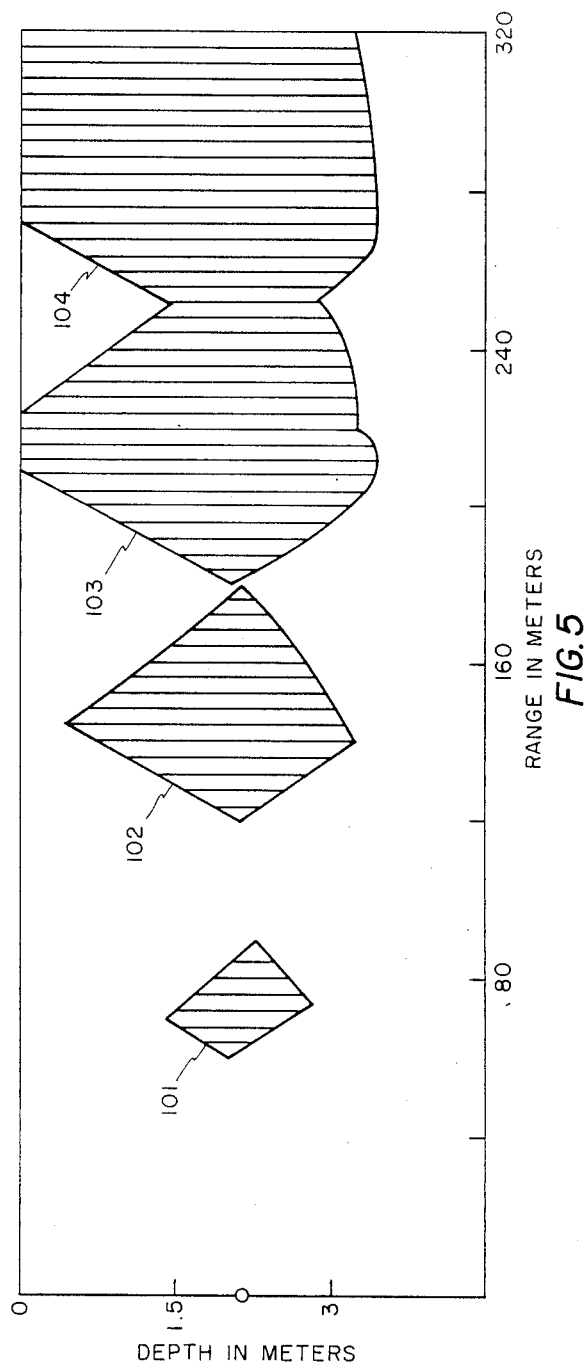
FIG. 5
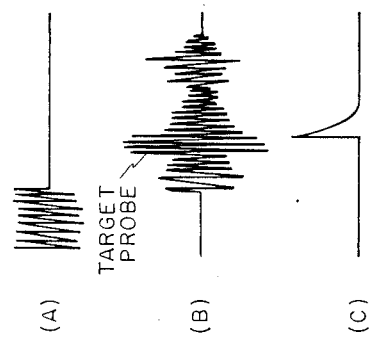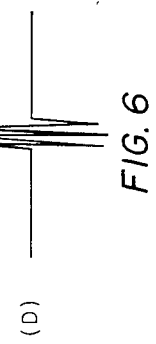
FIG. 6

SPLIT BEAM SONAR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention relates, in general, to echo-search-ranging systems and, in particular, is a unique sonar system for seeking, detecting, and identifying various and sundry objects located within an aqueous environmental medium.

DESCRIPTION OF THE PRIOR ART

Heretofore, many types of sonar systems have been employed for the purpose of detecting and identifying objects located within sea water or other subaqueous mediums. In numerous instances such sonar systems were employed for purposes similar to those of the subject invention; nevertheless, each thereof usually left something to be desired from, say, range and/or fidelity standpoints. Generally speaking, all known sonar systems operate on similar fundamental principles, in that acoustical energy is broadcast throughout a given volume of water to effect the sonification thereof, and portions of said broadcast acoustical energy are received and readout in intelligible terms after they are reflected back from one or more targets that happen to be located within said sonified volume of water. For such purpose, sonar transmitters electrically energize transmitting electroacoustical transducers, and acoustically energized receiving transducers, in turn, electrically actuate sonar receivers and readouts. Of course, copious quantities of combinations and permutations of such elements are well known and conventional in the art. Unfortunately, although quite suitable for many purposes, most of the prior art sonar devices are seriously handicapped in bay and estuarial environments where poor sonar conditions prevail much of the time, due to the presence of numerous vertical sound velocity gradients in the waters thereof. For example, poor sonar conditions exist either when a target is not insonified due to shadow zones—which may occur when thermoclines or salinity boundary layers exist along a given path—or when the transmitted sonic energy is refracted, scattered, or divided among so any ray paths that each of the pulses thereof has a travel time that is slightly different from that of the others and, thus, any one received echo pulse is too small for detection by the receiver. In other words, generally speaking, the operational subaqueous environment is so concentrated with existing noise or reverberation producing characteristics that, in many instances, the signal-to-noise ratios are such that intelligible sonar operations are not possible. In such instances, target search-ranging-identifying sonar operations are severely handicapped—in that the range rarely exceeds 150 yards—and quite often must be discontinued until a more advantageous subaqueous condition exists, because the intelligence or data signal would otherwise be lost in reverberation and noise. Thus, as previously indicated, the sonar systems of the prior art are not always as accurate or useful as desired; accordingly, any advancement in the art which succeeds in overcoming some of the aforementioned handicaps thereof is, indeed, worthwhile.

SUMMARY OF THE INVENTION

The present invention overcomes many of the disadvantages of the known prior art sonar systems, especially in shallow bodies of water—such as bays, rivers, estuaries, and the like—wherein, as previously suggested, sonar conditions are quite often poor due to the presence of vertical sound velocity gradients and reverberations.

In the particular preferred embodiment disclosed herewith, a gated sinusoidal signal is generated by a pulser which is power amplified and then used to energize a narrow beam electroacoustical transducer that is tilted upward from the horizontal at an angle of $+\theta$. Thus, acoustical signals are broadcast through the ambient water environment at said $+\theta$ angle as target search signals. Upon reflection thereof by an acquired target—that is, some physical object located within said water—some thereof, viz. the lower lobes thereof, are received by a receiving transducer or hydrophone which is likewise tilted, but at a downward angle $-\theta$ from the aforesaid horizontal. The received signals are amplified to a more useful level and preferably filtered before being displayed by an oscilloscope type readout.

The amplified and filtered received signal is also fed to a normally closed gate, the opening of which is controlled by a signal resulting from the display of a selected target being sensed by a light sensitive probe that is held at the face of the oscilloscope readout by a human operator. An integrator type peak detector arrangement, in turn, converts the gated output signal from the aforesaid gate to an error signal, which by means of a servo mechanism and an angular drive mechanism adjusts the relative angular positions of the aforesaid transmitting and receiving transducers in such manner as to cause the receiving transducer to receive a maximum intensity signal from the aforementioned human selected target. A manual override is employed to allow the human operator to either scan across wide angles of $\theta$ to acquire targets or to reduce the subject sonar system to a one-beam sonar by reducing each of angles $+\theta$ and $-\theta$ to zero degrees.

It is, therefore, an object of this invention to provide an improved sonar system.

Another object of this invention is to provide an improved method and means for locating target objects, especially those located in the shallow waters of bays, rivers, estuaries, coastal waters, and the like.

Still another object of this invention is to provide a sonar having an improved signal-to-noise ratio when operating under poor sonar conditions caused by the presence of shadow zones, vertical sound velocity gradients, multipath refractions, reverberations, and the like.

A further object of this invention is to provide an improved bistatic sonar system which does not require the separation of the transmitting and receiving transducers.

A further object of this invention is to provide an improved echo-search-ranging system which effects the transmission and projection of energy along one set of ray paths and causes the target echoes thereof to be received along another set of ray paths.

Another object of this invention is to provide an improved method and means for controlling the angular relationship between a transmitting transducer and a receiving transducer in response to an operator selected displayed acquired target, so as to effect the use of those broadcast and received rays to and from said target that are of optimum fidelity under the circumstance.

Another object of this invention is to provide an improved echo-search-ranging method and means for acquiring and identifying a target object located in a suitable reception zone in any appropriate environmental medium, regardless of the distortions existing therein.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 1 is a block diagram of the sonar system constituting a preferred embodiment of the subject invention;

FIG. 2 is an idealized theoretical representation of energy ray travel to and from a flat object, using different ray paths;

FIG. 3 is an idealized theoretical representation of ray paths showing how the use of dual ray paths is fairly independent of depth;

FIG. 4 is a graphical representation of idealized signal ray paths representing the transmitted (solid) and received (dashed) beams;

FIG. 5 is a graphical representation of the zones from which echo signals would be reflected in the event a target was located therein during the potential operational ray diagram conditions depicted in FIG. 5; and FIG. 6 is a graphical representation of search and potential echo signals traveling to and from a target object located within sea water or the like during the operation of the instant invention, with the transmitting and receiving transducers disposed at some predetermined angle $\theta$ with respect to the horizontal.

DESCRIPTION OF THE PREFERRED EMBODIMENT

Referring now to FIG. 1, the system constituting the subject sonar is shown as having a sonar transmitter 11 which includes an oscillator 12, a control gate 13, and a power amplifier 14 connected in series with the output of power amplifier 14 being the output of transmitter 11.

Perhaps at this time it would be worthwhile to note that any suitable conventional sonar transmitter may be used as transmitter 11, as long as it generates appropriately timed CW signals of the type that will be disclosed and discussed subsequently.

The output of power amplifier 14, in this particular instance, constitutes the output of transmitter 11, and it is connected to the input of an electroacoustical transmitting transducer 15. Transducer 15 is designed in such manner as to have predetermined directional characteristics, as is well known in the art. In addition, it is likewise designed to be rotatable about a given axis 16 so as to, when energized, broadcast acoustical energy in such manner and direction with respect to a reference datum—such as, for example, the earth's horizontal at any given location thereon—throughout a predetermined environmental medium—such as, for example, sea water, or the like—that it has a lobular pattern substantially similar to that depicted as acoustical energy lobe 18 in FIG. 1.

A receiving electroacoustical transducer 19 is designed in such manner as to be responsive to incoming sonic energy having a pattern similar to that shown as lobes 21, 22, and 23, as a result of incorporating a trio of piezoelectric energy converter elements 24, 25, and 26 therein, respectively. Receiving transducer 19 is also rotatable up and down and about the aforesaid given axis 16 and, in this particular instance, is preferably contiguously disposed with transmitting transducer 15, although the spatial dispositions thereof may be such as would optimize the operations thereof during any given circumstances.

Transducers 15 and 19 are effectively interconnected by any appropriately conventional linkage mechanism that will cause transducer 15 to be directed upwardly at the same angle $\theta$ that transducer 19 is directed downwardly relative to the horizontal. Hence, for such purpose, the longitudinal axes of the aforementioned broadcast and received acoustical energy lobes 18 and 22 are herewith defined as being located at $+\theta$ and $-\theta$ angles, respectively. Thus, it may readily be seen that acoustical energy will be broadcast in one direction within the aqueous medium 17 and received from another, with the angular difference between said directions being substantially $2\theta$ degrees.

Both the aforementioned transmitting and receiving transducers 15 and 19 may be any of several types, respectively; however, in this particular preferred embodiment, they optionally include liquid lenses 27 and 28, in order to have high fidelity, high resolution radiation patterns.

The output from receiving transducer 19 actually consists of a trio of outputs, one each from electroacoustical piezoelectric energy converter elements 24, 25, and 26, respectively. All are connected to the inputs of a unique receiver 29, with the latter mentioned converter elements also connected to appropriate inputs of a signal seeking target tracker 30 included within receiver 29. Hence, electroacoustical energy converters 24, 25, and 26 of receiving transducer 19 are connected to the inputs of a trio of amplifiers 31, 32, and 33, respectively, the outputs of which are respectively connected to the inputs of a trio of CW frequency signal passing filters 34, 35, and 36. The output of filter 34 is connected to the data input of a visual readout type of display 37, the actual visual indication 38 of which is provided by, say, a suitable cathode ray tube, or the like, which reads out a target 39 as a pulse of light 41, to which a light sensitive probe 42 - such as a photocell or the like - will be responsive, as will be discussed more fully subsequently. Of course, as may readily be seen, in this particular instance, the output of filter 34 constitutes the output of receiver 29.

The outputs of the aforesaid filters 35 and 36 of target tracker 30 are respectively connected to the data inputs of a pair of normally closed control gates 43 and 44, the outputs of which are respectively connected to the inputs of a pair of integrators 45 and 46. The outputs of integrators 45 and 46 are connected to the inputs of ar algebraic subtract circuit 47 of the type which always subtracts one input signal from the other and produces an output signal of level and polarity that is proportional to the difference therebetween. The output from subtract 47 is connected to a reversible servo motor 48 which, in turn, has the shaft output thereof connected to a suitable transducer angle drive 49. Transducer angle drive 49 is preferably composed of a pair of substantially equal size intermeshed gears which are effectively driven by a pinion connected to the output shaft of servo motor 48. Said gears, when driven, turn in opposite directions at equal angles. Although said train of gears of transducer angle drive 49 is not shown, the gears thereof respectively constitute the outputs of said angle drive 49 that are mechanically connected to the aforesaid transmitting and receiving transducers 15 and 19 and, thus, timely effect the equal and opposite angular ($\theta$) motion or rotation thereof relative to the horizontal. Of course, the aforementioned transducer angle drive 49 may be any other conventional type, if so desired, inasmuch as making the proper selection thereof would be well within the purview of the artisan having the benefit of the teachings presented herewith.

The output of subtract circuit 47 is also connected to the input of an adjustable threshold detector 51, and the output thereof is connected to the input of an acquisition indicator the latter of which facilitates the searching for and finding various and sundry targets by a human operator.

Of considerable importance in the instant invention is the inclusion of a programmer 53 which is connected to the output of the aforesaid target probe 42 for actuation thereby. Said programmer actually includes an adjustable delay line 54, with the input thereof connected to the output of target probe 42 and to each of the gating control inputs of the aforesaid gates 43 and 44. The output of delay 54 is connected to the actuation input of a clock pulse generator 55, with the output thereof connected to the gating control input of gate 13 of transmitter 11.

In the event a human operator wishes to manually adjust the angular positions of transducers 15 and 19 for purposes of quickly scanning the "field of view" in search of targets, a manual over-ride 56 is connected to the aforesaid servo motor for such purpose.

At this time, it would perhaps be noteworthy that all of the components indicated in block form are well known and conventional per se. It is, therefore, to be understood that it is their unique interconnections and interactions that effects the new combination constituting this invention and causes the abovementioned improved results to be produced thereby.

THEORY OF OPERATION

Assuming no variation of sound velocity with horizontal range, the diagrams of sonic rays propagating through sea water may be computed. Accordingly, it has been calculated that, due to salinity and temperature changes with water depth, a positive sound velocity gradient occurs in bays which causes the acoustic rays to be bent upward, thereby effecting a sound channel in the upper layer of the water, in the event the broadcasting transducer is located in that layer. Hence, if a target were located near the surface of the water at, say, a range of 400 meters, a sonar of the prior art would probably not be able to detect it, because the acoustical target search energy broadcast thereby would be divided into a multiplicy of propagation paths, each resulting in a pulse that is too small to be detected by a sonar receiver after it has been reflected from said target.

Consider first the idealized situation of FIG. 2, wherein only two sonic rays 61 and 62 broadcast at $\pm\theta$ by a transducer 63 are shown. Because sound velocity is theoretically not a function of horizontal range, there is a symmetry between any two rays transmitted with equal and opposite initial angles. Each time said rays cross each other, the same angular relationship exists. Thus, rays 61 and 62 have equal but oppositely directed angles $+\theta$ and $-\theta$ with respect to the horizontal. If a vertical wall or a target 64 with a vertical side is placed at one of the horizontal crossings of said rays, acoustical energy sent out along one ray (say ray 61) will reflect from said target 64 and return to the point of origin along the other ray (that is, ray 62).

As shown in FIG. 3, a similar relationship is approximately valid at other target depths, such as would occur if a particular target had a plurality of reflecting surfaces due to the irregular geometrical configuration thereof. In such case, although only a single acoustical energy ray 71 is broadcast by a transducer 72, a bundle of rays 73 through 78 would be returned from points 81 through 86, respectively located at different depths along a target 87 (or from a plurality of targets located at different water depths). Hence, from the foregoing, it may readily be seen that similar principles are involved in general cases of multiple reflections—as shown in FIG. 3-13 as well as in particular cases of single reflections—as depicted in FIG. 2.

Referring now to FIG. 4, there is shown a ray diagram wherein only a narrow bundle of sonic rays at the top and bottom of the original beam are drawn. For example, if a transmitting transducer 91 broadcasts a plurality of sonic rays 92 (represented by solid lines) in an upward direction at various angles throughout the aqueous environmental medium 93, they are reflected from the water-air interface 94 and then travel in a curved pattern along a convergent zone, as a result of refractions thereof within the medium. The return paths of the target echoes of said broadcast sonic rays 92 would ideally be represented by rays 95 (illustrated as dashed lines). In other words, the solid 14 lines may be visualized as being projected ray paths, and the dashed lines may be visualized as the received paths. To be detected, a target must lay in a region in which the solid and dashed lines overlap one another in FIG. 4; and the respective regions of possible target detection are, thus, depicted as separate patterns 101, 102, 103, and 104 in FIG. 5, with the latter two thereof overlapping somewhat.

As may readily be seen in FIG. 5, appropriately disposing the transmitting and receiving transducer of FIG. 1 at angles $+\theta$ and $-\theta$, respectively, to broadcast and receive the upper and lower sonic ray paths shown in FIG. 4—while deleting (that is, not generating and not being responsive to) all other sonic ray paths—increases the range within which underwater targets may be acquired. This, of course, is due to the fact that most specious signals—that is, those causing interference or noise—have been deleted as a result of the respective upward and downward directivity patterns of the transmitting and receiving transducers automatically excluding those not falling therein, thereby effecting a more concentrated or focused target echo signal of greater fidelity as far as detection, range, and identification are concerned. Obviously, within reasonable limits, the target search range may be varied by varying the angular dispositions of the transmitting and receiving transducers. For the representative angular setting of said transducers in FIG. 4, the patterns illustrated in FIG. 5 disclose those ranges in which underwater targets may be acquired in an optimum manner. For instance, each of said patterns represent the areas of overlapping of the solid and dashed line rays of FIG. 4, and, accordingly, any targets occurring therein would be detected, while any targets not occurring therein would not be detected. Assuming, as is the case most of the time, that mostly unwanted noise signals exist in the proximity of any acquired actual target, said noise signals would not be detected and received by the receiving transducer if they are outside the areas of the aforesaid overlapping patterns; hence, theoretically, to that extent the signal-to-noise ratio of the subject system is an improvement over the sonar systems used for similar purposes heretofore.

To further insure that the desired target echo signal is acquired with maximum strength and the least interference, it becomes necessary to adjust the angles (that is $+\theta$ and $-\theta$) of the transmitting and receiving transducers in such manner that their sonic rays overlap to form a pattern within which the target falls. This is, of course, accomplished by the proper adjustment of the subject system, the operation of which will now be discussed.

MODE OF OPERATION

The operation of the invention will now be discussed briefly in conjunction with all of the figures of the drawing, but predominantly with respect to FIGS. 1, 5, and 6.

As is conventional with all sonar systems, a search signal is broadcast and echoes thereof are received from targets acquired thereby. The subject invention is no exception, and, hence, a CW acoustical pulse similar to that shown in FIG. 6(A) is broadcast through the ambient aqueous environmental medium being target searched in accordance with the sonic energy pattern projected by transmitting transducer 15. For the purpose of facilitating the detection of desired targets, the search range is varied or swept manually by means of a human operator manipulating manual override 56 in such manner as to vary angles $+\theta$ and $-\theta$ of transducers 15 and 19 from zero to maximum. While so doing, one or more targets may be acquired, and if one thereof is of the type being hunted, the aforesaid transducers 15 and 19 are angularly adjusted to make it fall within the overlapping sonic rays of FIG. 4, thereby causing it to fall within the pattern of FIG. 5 that occurs for the range thereof. Although such adjustment could be made continuously by a human operator, it has been found that better results are obtained if it is done semi-automatically by the control circuit of FIG. 1.

Assume, for example, that a desired target 39 is acquired and read out on scope 38 of display 37 and that the display thereof is similar to pulse of the total received signal illustrated in FIG. 6(B). Then the human operator holds light sensitive probe 42 in contiguous disposition with said target pulse 39. As a result, whenever pulse 39 occurs (as a result of the timely broadcast and reception of sonic signals), it energizes probe 42 which, in turn, produces an output signal similar to that depicted in FIG. 6(C) which is applied to control gates 43 and 44 to timely effect the opening thereof. At that time, only the received echo signal of the selected target is passed by gates 43 and 44, and, accordingly, it is displayed as a signal similar to that shown in FIG. 6(D). As may be seen, substantially all signals except the probe selected target signal has been removed from the waveform of FIG. 6(D).

In the event a particular target is acquired by one of the adjacent lobes of receiving transducer, the target tracker produces an error signal which causes transducer 19 to become centered on the target. For example, if a target is acquired by lobe 21, the strength of the target signal processed by energy converter 24, amplifier 32, filter 35, gate 43 and integrator 45 is stronger than the strength thereof processed by energy converter 26, amplifier 33, filter 36, gate 44, and integrator 46. Thus, subtract circuit 47 produces a signal that is proportional to the difference thereof and that has a polarity that causes servo motor 48 and angle drive 49 to run in such direction as to move receiving transducer 19 in a rotary direction that makes center lobe 22 thereof close on the target. Of course, in the event center lobe 22 over-rides the target, the reverse operation will take place in target tracker circuit 30 and transducer 19 will hunt with decaying oscillations the acquired target until such time as it locks thereon.

After the target (say, target 39) is acquired and locked on, the human operator holds light sensitive probe 42 near the face of scope 38, where it is energized by the light ray 41 of target 39. Such energization thereof causes it to produce a pulse that opens normally closed gates 43 and 44, and after a delay by delay line 54, clock pulse generator is triggered to produce a signal that, in turn, opens normally closed gate 13. Opening gate 13 allows a CW signal from oscillator 12 to pass therethrough, be amplified to a more useful level by amplifier 14, and broadcast by transmitting transducer 15. Because transducer 15 is positioned at the proper angle 28 with respect to transducer 19, an optimum broadcast and receive condition exists, in accordance with the theory of operation mentioned above.

From the foregoing, it may be seen that improved underwater target detection and identification is effected by this invention.

Also, from the foregoing, it may readily be seen that, with the proper design changes incorporated therein, the subject invention may be used to hunt, acquire, and identify targets in numerous ambient or environmental mediums other than water, if so desired, since the making of such design choices would be well within the purview of one skilled in the art having the teachings presented herewith.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An echo-search system, comprising in combination:

means for broadcasting a predetermined energy signal at a first predetermined angle with respect to a reference datum within a predetermined environmental medium;

means for receiving a reflected target echo of the aforesaid broadcast predetermined energy signal at a second angle that is substantially equal to the aforesaid first predetermined angle but opposite thereof with respect to said reference datum within said predetermined environmental medium;

means connected to the output of said receiving means for reading out the reflected target echo received thereby in terms of a visual radiant energy signal on a display screen; and means connected to the aforesaid broadcasting and receiving means for the timely actuation of said broadcasting and receiving means in response to receiving the aforesaid visual radiant energy signal from said display screen.

2. The device of claim 1, wherein said echo-search system comprises a sonar system, and said predetermined energy broadcast signal and the aforesaid received reflected target echo thereof each comprises acoustical energy signals.

3. The device of claim 1, wherein said means connected to the output of said receiving means for reading out the reflected target echo received thereby in terms of a visual radiant energy signal on a display screen is an oscilloscope incorporating a cathode ray tube.

4. The device of claim 1, wherein said means effectively connected to the aforesaid broadcasting and receiving means for timely actuation of said broadcasting and receiving means in response to receiving the aforesaid visual radiant energy signal from said display screen comprises:
- a probe, having a radiant energy sensitive input and an output, for producing an electrical output signal in response to and proportional to the intensity of the aforesaid visual radiant energy signal whenever it is placed for the reception thereof;
- a variable delay connected to the output of said probe; and
- a clock pulse generator connected between the output of said delay and an actuation input of said broadcasting means.

5. The device of claim 1, wherein said means for broadcasting a predetermined energy signal at a first predetermined angle with respect to a reference datum within a predetermined environmental medium comprises:
- a transmitter; and
- a transmitting transducer, adapted for being rotated about a predetermined axis, connected to the output of said transmitter.

6. The device of claim 5, wherein said transmitter comprises:
- an oscillator for producing a predetermined frequency signal;
- a gate having a data signal input, a gating control input, and an output, with the data signal input connected to the output of said oscillator; and
- a power amplifier connected to the output of said gate.

7. The device of claim 5, wherein said transmitting transducer comprises an electroacoustical transducer for broadcasting acoustical energy with a predetermined radiation pattern in response to an electrical signal supplied thereto by said transmitter.

8. The device of claim 1, wherein said means for receiving a reflected target echo of the aforesaid predetermined energy signal at a second angle that is substantially equal to the aforesaid first predetermined angle but opposite thereof with respect to said reference datum within said predetermined environmental medium comprises:
- a receiver; and
- a receiving transducer, adapted for being rotated about a predetermined axis, connected to the input of said receiver.

9. The device of claim 8, wherein said receiver comprises:
- a trio of amplifiers;
- a trio of filters, each of which has an input and an output, with the inputs thereof respectively connected to the outputs of said trio of amplifiers and with the output of one thereof connected to the input of the aforesaid readout means;
- a pair of gates, each of which has a data signal input, a gating control input, and an output, with the inputs thereof respectively connected to the outputs of the remaining pair of the aforesaid trio of filters;
- a pair of integrators respectively connected to the outputs of said pair of gates;
- a subtract circuit connected to the outputs of said integrators for producing an error output signal whose amplitude and polarity are proportional to the algebraic difference between the signals supplied thereto by said integrators;
- a servo motor connected to the output of said subtract circuit adapted for having an output shaft rotation that is proportional in amount and direction to the amplitude and polarity of the aforesaid error output signal, respectively; and
- a transducer angle drive connected to the shaft output of said servo motor for the driving of said transmitting and receiving transducers at equal and opposite angles from said reference datum in an angular amount that is proportional to the aforesaid error output signal.

10. The device of claim 8, wherein said receiving transducer comprises:
- a first energy converter for producing a first electrical output signal that is proportional to a predetermined energy signal received from within a first predetermined lobular response pattern;
- a second energy converter, contiguously disposed with said first energy converter, for producing a second electrical output signal that is proportional to that portion of said predetermined energy signal received from within a second predetermined lobular response pattern that partially overlaps the aforesaid first predetermined lobular response pattern; and
- a third energy converter, contiguously disposed with said second energy converter, for producing a third electrical output signal that is proportional to that portion of said predetermined energy signal received from within a third predetermined lobular response pattern that partially overlaps the aforesaid second predetermined lobular response pattern.

11. A split beam sonar system, comprising in combination:
- an adjustable frequency oscillator;
- a first control gate having a data signal input, a gating control input, and an output, with the data signal input thereof connected to the output of said adjustable frequency oscillator;
- a power amplifier connected to the output of said first control gate;
- a rotatable transmitting electroacoustical transducer connected to the output of said power amplifier for broadcasting acoustical energy within a predetermined radiation pattern directed at a predetermined angle with respect to a given reference;
- a rotatable receiving electroacoustical transducer having a first energy converter for producing a first electrical output signal that is proportional to a predetermined acoustical energy signal received from within a first predetermined lobular response pattern, a second energy converter contiguously disposed with said first energy converter for producing a second electrical output signal that is proportional to that portion of said predetermined acoustical energy signal received from within a second predetermined lobular response pattern that partially overlaps the aforesaid first predetermined lobular response pattern, and a third energy converter contiguously disposed with said second energy converter for producing a third electrical output signal that is proportional to that portion of said predetermined acoustical energy signal received from within a third predetermined lobular response pattern that partially overlaps the aforesaid second predetermined lobular response pattern;

a trio of amplifiers respectively connected to the outputs of the first, second, and third energy converters of the aforesaid rotatable receiving electroacoustical transducer;

a trio of filters, each of which has an input and an output, with the inputs thereof respectively connected to the outputs of the aforesaid trio of amplifiers;

a readout, having a cathode ray tube display means incorporated therein or displaying acquired targets as light pulses on the screen thereof, connected to the output of the one filter of the aforesaid trio of filters that is effectively connected to the second energy converter of said rotatable receiving electroacoustical transducer;

a pair of control gates, each of which has a data signal input, a gating control input, and an output, with the data signal inputs thereof respectively connected to the outputs of the remaining pair of the aforesaid trio of filters;

a pair of integrators respectively connected to the outputs of said pair of control gates;

a subtract circuit having a pair of inputs and an output, with the inputs thereof respectively connected to the outputs of said integrators, for producing an error signal that is proportional to the amplitude and polarity difference between the outputs of said pair of integrators;

a reversible servo motor connected to the output of said subtract circuit for providing an output shaft rotation that is proportional to said error signal;

a transducer angle drive means connected between the output shaft of said reversible servo motor and the aforesaid transmitting and receiving transducers for effecting the respective rotation thereof at equal and opposite angles with respect to the aforesaid given reference in response to the shaft output of the aforesaid reversible servo motor;

a portable manually operable light responsive probe, having a light sensitive input and an output, for generating an electrical signal at the output thereof in response to a lighted target displayed on the screen of the cathode ray tube of the aforesaid readout, with the output thereof connected to the gating control inputs of the aforesaid pair of control gates;

an adjustable delay line connected to the output of said probe; and an adjustable frequency clock pulse generator connected between the output of said adjustable delay line and the gating control input of said first control gate.

12. The invention of claim 11, further characterized by:

a variable threshold detector connected to the output of said subtract circuit;

an acquisition detector connected to the output of said threshold detector; and a manual over-ride connected to the aforesaid servo motor for manually effecting the rotation thereof in such manner as to provide expeditious environmental medium scanning by the aforesaid rotatable transmitting and receiving transducers.

* * * * *